US007794769B2

(12) United States Patent
Cox et al.

(10) Patent No.: US 7,794,769 B2
(45) Date of Patent: Sep. 14, 2010

(54) REDUCED SUCROSE COOKIE DOUGH

(75) Inventors: Julie A. Cox, Maple Grove, MN (US);
Lisa M. Stoiber, Golden Valley, MN (US); Brian E. Glass, Maple Grove, MN (US); Kristin L. Bahe, Coon Rapids, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 1390 days.

(21) Appl. No.: 11/081,453

(22) Filed: Mar. 16, 2005

(65) Prior Publication Data

US 2005/0220961 A1     Oct. 6, 2005

Related U.S. Application Data

(60) Provisional application No. 60/554,813, filed on Mar. 19, 2004.

(51) Int. Cl.
*A23L 1/236* (2006.01)
*A21D 10/00* (2006.01)

(52) U.S. Cl. .................. 426/548; 426/496; 426/549

(58) Field of Classification Search .................. 426/496, 426/548, 549, 550, 601
See application file for complete search history.

(56) References Cited

U.S. PATENT DOCUMENTS

| 5,160,546 | A | 11/1992 | Kawashima et al. |
| 5,171,599 | A | 12/1992 | Weber |
| 5,620,713 | A | 4/1997 | Rasmussen |
| 6,561,235 | B2 | 5/2003 | Finkowski et al. |

OTHER PUBLICATIONS

Kimberlee J. Burrington, Jul. 1999, *Inside Cookies and Crackers*.
Richard L. Barndt and Graham Jackson, Jan. 1990, *Stability of Sucralose in Baked Goods*.
Riaz Khan, 1993, *Low-Calorie Foods and Food Ingredients*.
Anibal Torres and Raul D. Thomas, Jul. 1991, *Polydextrose and Its Application in Foods*.
J.D Dziezak, Jan. 1986, *Sweetners IV. Applicatons of Polydextrose*.
Graham Cooper, Jan. 1993, *Second General Polyols in Bakery Products*.
P.M. Olinger and V.S. Velasco, 1996, *Opportunities and Advantages of \*Sugar\* \*Replacements\**.
David Bradley, Nov. 1992, *How to Have Your Cake and Eat It*.
H.L.W. Timmerman, Nov. 1990, *Application of \*Polyols\* in \*Bakery\* Products*.
Kimberly J. Decker, Mar. 1999, *Sweet Without the Sugar*.
Ronald C. Deis, Ph. D, Feb. 2001, *Sweetners for Health Foods*.
Diane Toopes, Feb. 1995, *A Sunny Forecast for Sunett*.
Dr. Lotz, et al, 1993, *Calorie Reduced and \*Sugar\* \*Free\* \*Baked\* \*Goods\* with Sunett*.
Trends, Apr. 1994, *Bakers Find New Routes to 'Healthy' Sweet Products*.
Daniel Best, Mar. 1989, *High-Intensity Sweetners Lead Low-Calorie Stampede*.
A. Peck, 1994, *Use of Acesulfame K in Light and Sugar-Free Baked Goods*.
Caroline Garman, 2000, *The Use of Speciality Sweetners in \*Baked\* \*Goods\**.
Kennedy's Confection, 1994, *Sweetness and Light*.
Clyde E. Stauffer, Ph. D, Apr. 1999, *Sweet Taste Sensation*.
Zoulias, et al, Sep. 2002, *Effect of Fat and Sugar Replacement On Cookie Properties*.
P. Desbonnets, 1998, *Maltitol New Opportunities for Baking*.
Marguerite Young, Mar. 1999, *Use of Sugar Alcohols (Polyols) in Bakery Products*.
E. Wolf, 1981, *Practical Problems of Cyclamate and Saccharin Incorporation in Foodstuffs*.
L. A. Brandt, Mar. 1999, *The Volume Baker's Sugar-Free Challenge*.
Brandt, et al, 1993, *Fat and Calorie-Modified Bakery Products*.
McIntyre, Nov. 2001, *Isomalt as an International Sugar Replacer*.
Arndt, et al, 1989, *Evaluation of Sweetner Syrups Derived From Whey as Replacements for Sucrose in Sugar-Snap Cookies*.
Shin, et al, 1999, *Characteristics of Sugar Cookie with Replacement of Sucrose With Sugar Alcohols. I. Organoleptic Characteristics of Sugar Alcohol Cookies*.
Shin, et al, 1999, *Characteristics of Sugar Cookie with Replacement of Sucrose With Sugar Alcohols. II. Textural Characteristics of Sugar Alcohol Cookies*.
Drewnowsi, et al, 1998, *Replacing Sugar and Fat in Cookies*.
Zoulias, et al, 2000, *Effect of Sugar Replacement by Polyols and Acesulfame-K on Properties of Low-Fat Cookies*.
Innovations in Food Technology, 1998, *Isomalt—a Unique Sugar Substitute*.
Haas, et al, 2000, *Use of Erythrol and/or Xylite as Partial or Full Sugar Substitute in Baking Masses or Doughs for Dry Baked Goods Made of Flours and/or Starches*.
Wallin, 1998, *Sugarless Bakery Goods, e.g. Cakes*.
Peremans, et al, 1992, *Sweet Substitute*.
Cooper, Jan. 1993, *Second Generation Polyols in Bakery Products*.

*Primary Examiner*—Leslie Wong
(74) *Attorney, Agent, or Firm*—Arlene L. Hornilla; Dale A. Bjorkman

(57) ABSTRACT

A reduced sucrose cookie dough is provided comprising a Saccharide System. The Saccharide System comprises a crystalline sugar alcohol comprising at least one member selected from the group consisting of crystalline maltitol, crystalline lactitol, and crystalline isomalt and at least one member selected from the group consisting of a liquid sugar alcohol and a long chain sugar complex. The Saccharide System has a Collective Solubility that is within about 20% of the solubility of sucrose in the dough. The cookie dough has a sucrose content of less than 0.5 grams per serving size. Methods of making the cookie dough are also provided.

20 Claims, No Drawings

REDUCED SUCROSE COOKIE DOUGH

REFERENCE TO RELATED APPLICATIONS

This application claims the benefit of priority under 35 U.S.C. 119(e)(1) of a provisional patent application Ser. No. 60/554,813, filed Mar. 19, 2004, which is incorporated herein by reference in its entity.

FIELD OF THE INVENTION

The invention relates to cookie dough. More specifically, the invention relates to cookie dough having little or no sucrose.

BACKGROUND

Consumers commonly enjoy the convenience of packaged food products such as dough products. In particular, raw dough products have gained commercial success as provided in frozen or refrigerated forms to facilitate consumers making home-baked dough products. Moreover, such raw dough products are typically packaged to facilitate consumer use, as desired. Potential consumers of such refrigerated or frozen dough products include individual in-home consumers, as well as in-store bakeries and restaurants that bake cookies on-site and sell the cookies to consumers at the bakery or restaurant.

Many dough products suitable for packaging as frozen or refrigerated products have been developed. As an example, sweet dough products such as certain types of cookies are frequently packaged in frozen or refrigerated forms. More recently, these frozen or refrigerated cookie dough products designed for home consumers have been provided as a separable block, where the consumer must first separate the individual portions of the block prior to baking. Another format for home consumer frozen or refrigerated cookie dough products provides individual cookie pucks, or preformed cookies, that the consumer simply transfers from the packaging to a baking pan for baking at the appropriate temperature. According to this latter format, no manipulation of the dough product is required by the consumer.

One type of dough used to produce cookies is a comparatively stiff, dry and crumbly dough of the type which when baked produces relatively hard cookies (for example, animal cookies and the typically round wafers that are often made into cookie sandwiches by placing a layer of frosting or confection between a pair of them). This type of baking dough typically lends itself to rotary molding devices, as it can easily be compressed into relatively shallow configured cavities in the rotary die, the cavity design and hardness of dough contributing to a clean complete release from such cavities subsequent to shaping.

Another type of dough used to produce cookies is "soft" dough, from which softer baked goods are made, in particular the soft type of cookies regarded as being more like homemade cookies. Such soft dough is considerably more flowable, as well as more sticky than the drier dough discussed above. Further, such soft doughs may not pack in the same sense as the drier cookie doughs and are thus much more difficult to force into the configured die cavities and the like of a rotary molding device so as to completely fill them. Such soft doughs are typically more suitable for wirecut processes of manufacturing. The soft cookie dough is generally characterized by comparatively high sugar and high shortening content, typically in the range of 50-70 baker's percent or more, for each ingredient. Generally, soft cookie doughs possess adequate cohesiveness to hold together, yet yield clean separations of the individual dough pieces as the individual dough pieces are cut by a conventional wirecut apparatus.

Today's health-conscious consumers wish to reduce their consumption of sugar, and particularly sucrose, for a number of reasons, including reduction of calorie intake. For this reason, sugar substitutes, sometimes called high potency sweeteners, have been developed. Sugar substitutes may be very effective for use in certain food products, such as soft drinks and the like. The direct substitution of sugar with high potency sweeteners in other products, such as baked goods, is more problematic. Sugar plays a number of roles in the overall flavor and texture and appearance properties of food products in addition to simply providing a sweet taste.

SUMMARY OF THE INVENTION

Formulation of raw, prepackaged cookie doughs present unique challenges, in that the dough itself must have desired consistency for processing and handling, both for the dough manufacturer and for the end user that will bake the dough. For optimal handling in both environments, the dough must not be too dry and crumbly or too sticky.

Today's consumer also has high expectations for the organoleptic properties of cookies, even when provided in a very convenient form. Cookies are expected to be sweet, and additionally have little or no undesirable aftertaste. While flavor is always of preeminent importance, texture and mouthfeel are also of significance in the enjoyment of cookies. Size, shape, and visible texture are important aspects of the consumer's enjoyment of a cookie. A particularly desirable aspect of the baked soft cookie embodiments of the invention is achieving a so called "dual texture," which is a characteristic wherein the center of the cookie is distinguishably softer than the outer perimeter of the cookie.

A reduced sucrose cookie dough having desirable organoleptic properties may surprisingly be achieved by providing a dough comprising a Saccharide System, wherein the Saccharide System comprises a crystalline sugar alcohol comprising from at least one member selected from the group consisting of crystalline maltitol, crystalline lactitol, and crystalline isomalt; and additionally at least one member selected from the group consisting of a liquid sugar alcohol and a long chain sugar complex. The Saccharide System has a Collective Solubility that is within about 20% of the solubility of sucrose in the dough. In an embodiment, the Saccharide System has a Collective Solubility that is within about 10% of the solubility of sucrose in the dough. The cookie dough of the invention has a sucrose content of less than 0.5 grams per serving size. In one embodiment, the cookie dough has a sucrose content of less than about 2% by weight based on the weight of the cookie dough. In another embodiment, the cookie dough is substantially free of sucrose.

In another embodiment, the cookie dough of the invention has a sugar content of less than 0.5 grams per serving size. In another embodiment, the cookie dough has a sugar content of less than about 2% by weight based on the weight of the cookie dough. In another embodiment, the cookie dough is substantially free of sugar. For purposes of the present invention, the term "sugar" as used in the context of the ingredient to be present in the cookie of the present invention in little or no amount is defined as free mono- and disaccharides (such as glucose (dextrose), fructose, lactose, maltose, and sucrose). Providing a cookie that has little or no sugar as defined herein can be particularly beneficial to diabetics and others who are sensitive to forms of sugar other than sucrose.

Typical sucrose replacement strategies for food products focus on finding a sugar substitute that can match the sweetness level of sucrose. These strategies do not recognize that by selecting the components of the Saccharide System to match the dough solubility of sucrose, other organoleptic and physical handling properties are substantially benefited. Surprisingly, the solubility characteristics for each individual ingredient of the Saccharide System do not need to be the same as sucrose to achieve the desired organoleptic properties of the final cookie dough. Instead, the solubility properties of each of the Saccharide System ingredients prior to mixing in the dough are added together to create a "Collective Solubility" of the Saccharide System that is compared to the solubility of sucrose in the dough system. For purposes of the present invention, the Collective Solubility is determined by the following formula:

$$\frac{\begin{array}{l}[(\text{g Saccharide System component } A/\text{g dough}) \\ (\text{Saccharide System component } A \text{ solubility})^{-1} + \\ (\text{g Saccharide System component } B/\text{g dough}) \\ (\text{Saccharide System component } B \text{ solubility})^{-1} + \ldots \\ (\text{g Saccharide System component } Z/\text{g dough}) \\ (\text{Saccharide System component } Z \text{ solubility})^{-1}]\end{array}}{\text{g available water/g dough}}$$

The Collective Solubility is an additive effect. In an embodiment, the components of the Saccharide System have a Collective Solubility of +/−20% of the solubility of sucrose in the dough. The solubilities used for the ingredients are published values, which are published as g ingredient/100 g $H_2O$ (at 25C).

It has been found that the Collective Solubility of the Saccharide System is related to the organoleptic properties of the final baked cookie product and the physical handling properties of the raw dough, even though the Saccharide System ingredients can be added at different times in the dough manufacturing process. Separate addition of ingredients is particularly desirable in the invention in order to preserve the solubility characteristics of each Saccharide System component as it interacts with other dough components. Thus, for example, the crystalline sugar alcohol components of the Saccharide System should not be added to water prior to mixing with all of the other ingredients of the dough composition. While not being bound by theory, it is believed that the crystalline nature of the crystalline sugar alcohol components solubilize at a particular rate, and otherwise interact with ingredients in the dough to provide a specific mouth feel and other textural properties when the cookie dough is baked. Premature solvation of the crystalline sugar alcohols will convert this ingredient to a sugar alcohol syrup, thereby modifying the effective Collective Solubility of the Saccharide System prior to mixing of all of the ingredients in the dough manufacturing process. It will be recognized that at least a portion of the crystalline sugar alcohol components will be solvated by water present in the dough ingredients during the dough manufacturing process, so that the resulting dough composition may have a substantially smaller amount of sugar alcohols in the crystalline state even prior to baking as compared to the amount initially added to the dough ingredients.

In one aspect of the invention, a method of making a reduced sucrose cookie dough is provided, comprising first mixing a fat with a crystalline sugar alcohol selected from at least one member of the group consisting of crystalline maltitol, crystalline lactitol, and crystalline isomalt, or with a crystalline sugar alcohol selected from at least one member of the group consisting of crystalline maltitol, crystalline lactitol, and crystalline isomalt in combination with another crystalline sugar alcohol and/or a long chain sugar complex, to form a fat/crystalline sugar alcohol or a fat/crystalline sugar alcohol/long chain sugar complex composition. These compositions are mixed with water and may comprise additional Saccharide System ingredients, wherein the additional Saccharide System ingredients are liquid sugar alcohols. The systems are then mixed with flour and other dry ingredients to create the final cookie dough. The Saccharide System used will have a Collective Solubility that is within about 20% of the solubility of sucrose in the dough, and the cookie dough has a sucrose content of less than about 2% by weight based on the weight of the cookie dough.

DETAILED DESCRIPTION

The cookie doughs of the invention can be in a variety of formats, such as raw, refrigerated, par-baked, or frozen. The doughs provide a cookie that when baked, is generally regarded as 'soft' and/or 'fresh-baked.' As noted above, the Saccharide System of the cookie doughs of the invention comprises a unique combination of components. For purposes of the invention, all ingredients present in the cookie dough that are saccharide monomers, oligomers or polymers and their alcohol derivatives are considered to be part of the Saccharide System, regardless of order of addition in the dough composition.

The first component of the Saccharide System as described herein is a crystalline sugar alcohol selected from at least one member of the group consisting of crystalline maltitol, crystalline lactitol, and crystalline isomalt. The crystalline state of this alcohol is important to the invention, because the physical state of the alcohol has a surprising impact on the physical properties of the dough for handling purposes prior to baking or storage refrigeration or freezing, as well as the organoleptic properties, including flavor and texture, of the final baked product.

The second component of the Saccharide System as described herein is b) at least one of a liquid sugar alcohol and a long chain sugar complex.

In one embodiment, the component b) is a liquid sugar alcohol. In an embodiment, the liquid sugar alcohol is selected from the group consisting of solubilized maltitol, sorbitol, isomalt, or lactitol, liquid hydrogenated starch hydrolysates, and mixtures thereof. Optionally, the non-liquid sugar alcohol and the liquid sugar alcohol may be nominally the same sugar alcohol compound, but provided in different forms. For example, the non-liquid sugar alcohol may be crystalline maltitol and the liquid sugar alcohol may be solubilized maltitol.

In another embodiment, the component b) is a long chain sugar complex. In certain embodiments, the long chain sugar complex is selected from the group consisting of polydextrose, and oligofructose complexes and mixtures thereof. In an embodiment, the long chain sugar complex is selected from the group consisting of inulin, levan, and graminan complexes, and mixtures thereof.

The Saccharide System as described herein may additionally comprise a crystalline sugar alcohol other than crystalline maltitol, crystalline lactitol, and/or crystalline isomalt, such as crystalline sorbitol, crystalline erythritol, or a mixture thereof.

In one embodiment, the Saccharide System comprises crystalline sorbitol. Crystalline sorbitol, however, does not exhibit solubility characteristics that render this sugar alcohol suitable for use as the only crystalline sugar alcohol in the cookie dough formulation. When crystalline sorbitol is used in a cookie dough, the amount of crystalline maltitol, crystalline lactitol, and/or crystalline isomalt that is used in the Saccharide System may be reduced somewhat as compared to other formulations of the invention that do not use crystalline sorbitol.

In an embodiment, the non-liquid sugar alcohol is present as from about 50 to about 70% of the Saccharide System. When calculating the weight contribution of liquid components of the Saccharide System, only the contribution of the solids portion of the liquid component is used in the calculation. Other embodiments of the invention include Saccharide Systems that comprise:

(1) from about 50 to about 70% of a crystalline sugar alcohol and from about 30 to about 50% of a liquid sugar alcohol based on the weight of the total Saccharide System. An embodiment of the Saccharide System of this type comprises from about 50 to about 70% crystalline maltitol and from about 30 to about 50% solubilized maltitol based on the weight of the total Saccharide System.

(2) from about 50 to about 70% of a crystalline sugar alcohol and from about 30 to about 50% of a long chain sugar complex based on the weight of the total Saccharide System. An embodiment of the Saccharide System of this type comprises from about 50 to about 70% maltitol and from about 30 to about 50% polydextrose based on the weight of the total Saccharide System.

(3) from about 50 to about 70% of a crystalline sugar alcohol, from about 10 to about 20% of a liquid sugar alcohol and from about 20 to about 40% of a long chain sugar complex based on the weight of the total Saccharide System. An embodiment of the Saccharide System of this type comprises from about 50 to about 70% lactitiol, from about 10 to about 20% solubilized Sorbitol, and from about 20 to about 40% polydextrose based on the weight of the total Saccharide System.

(4) from about 50 to about 70% of a non-sorbitol crystalline sugar alcohol, from about 10 to about 20% of crystalline sorbitol and from about 20 to about 40% of a long chain sugar complex based on the weight of the total Saccharide System. An embodiment of the Saccharide System of this type comprises from about 50 to about 70% lactitol, from about 10 to about 20% sorbitol, and from about 20 to about 40% polydextrose based on the weight of the total Saccharide System.

The Saccharide System of the cookie dough of the invention in one embodiment comprises a high potency sweet flavorant. For purposes of the invention, a high potency sweet flavorant is a component that provides a sweet taste to the final product, where the component contributes no calories or where the component does contribute calories, but possesses a sweetness potency that is so high that their extremely low usage level imparts no significant impact on the final product's caloric content. Embodiments of high potency sweet flavorants are selected from the group consisting of saccharin, aspartame, acesulfame potassium, sucralose, cyclamate, neotame, alitame and mixtures thereof.

Typically, the cookie dough will include flour, Saccharide System, fat, leavening agent, water, and other ingredients. Any suitable type or combinations of flour commonly used in or developed for cookie dough can be used according to the invention. A typical flour commonly used in cookie dough is a soft white winter wheat flour with a protein content of 7.5%-8.5%. When stronger flours are used in order to prevent excessive cookie spread during baking, and to preserve any optional ornamental imprint that may be applied during manufacture of the cookie, the levels of shortening and Saccharide System can be adjusted to maintain optimum tenderness. The flour content of the cookie dough according to the invention is in one embodiment in the range of about 10% to about 60%, in another embodiment in the range of about 20% to about 40%, and in another embodiment in the range of about 27% to about 37% by weight based on the weight of the cookie dough.

The total Saccharide System content of the dough according to the invention is in one embodiment in the range of about 2% to about 50%, and in another embodiment in the range of about 10% to about 40% by weight based on the weight of the cookie dough.

The fat in the cookie dough can be a solid, semi solid or liquid fat, or combinations thereof at room temperature. The fat can be of animal or plant origin, such as, for example, butter, butter oil, canola oil, coconut oil, copra oil, corn oil, cotton oil, lard, margarine, olive oil, palm oil, palm kernel oil, peanut oil, safflower oil, soybean oil, sunflower oil, tallow, and the like, or combinations thereof. The fats can be emulsified or stabilized with mono- or diglycerides or other emulsifiers known in the art. The total fat content of the cookie dough according to embodiments of the invention is in one embodiment in the range of about 5% to about 35%, and in another embodiment in the range of about 10% to about 25% by weight of added fat based on the weight of the cookie dough.

In an embodiment of the invention, selection of the Saccharide System as discussed herein facilitates substantial reduction of the fat content of the cookie dough. Surprisingly, it has been found that merely substituting the Saccharide System as described herein for the sugar component of a conventional sugar-containing cookie recipe may result in a cookie dough that is undesirably sticky. Thus, an embodiment of the invention is a cookie dough comprising less than about 12% by weight of added fat based on the weight of the cookie dough. Advantageously, reducing fat content both improves organoleptic properties and reduces calorie content of the cookie. In an embodiment, the cookie dough of the invention has a calorie content of less than about 100 calories per 26 grams of dough.

The cookie dough typically includes one or more leavening agents to provide desirable flow properties during baking, resulting in a baked product of desired shape. Any conventional leavening agent can be utilized in accordance with the invention, for example, sodium bicarbonate, phosphates (such as disodium dihydrogen pyrophospate or sodium aluminum phosphate), and the like. Baking powder, which comprises a mixture of at least one bicarbonate or carbonate salt, at least one acidifying agent and at least one separating agent can also be used. In an embodiment, sodium bicarbonate is used with sodium diphosphate or disodium dihydrogen pyrophosphate, and a starch as separating agent. These mixtures are available commercially with a fixed composition. In one embodiment, sodium bicarbonate can be used alone, in an amount in the range of about 0.2% to about 0.7% based on the weight of the cookie dough. An embodiment of the leavening system is a combination of sodium bicarbonate and sodium aluminum phosphate.

The cookie dough will have a moisture content in one embodiment in the range of about 2% to about 25%, and in another embodiment in the range of about 8% to about 22% by weight based on the weight of the cookie dough.

The cookie dough can include other optional ingredients, such as one or more of texturing agents, flavoring agents, and inclusions. Suitable texturing agents include whole egg or egg white, liquid or dried egg powder, or any egg substitute. When present, the texturizing agent can be present in an amount in the range of about 0. 1% to about 10%, and in another embodiment in an amount in the range of about 0.5% to about 5% by weight based on the weight of the cookie dough. Examples of flavoring agents include natural and high potency flavoring agents, including cinnamon, cocoa powder, fruit flavor, ginger, nut flavor (for example, peanut butter or peanut flour), vanilla flavor, and the like, and combinations of these. These are in one embodiment present in an amount in the range of about 0.01% to about 8%, and in another embodiment in the range of about 0.25% to about 7% by weight based on the weight of the cookie dough.

The cookie dough can include inclusions, as are well known in the art. Examples of inclusions include caramel, chocolate pieces, fruit pieces, oat flake pieces, raisins, whole nuts or nut pieces (for example, walnuts, peanuts and the like), and the like, or mixtures thereof. When present, the inclusions can be of any suitable size, and are in one embodiment in the range of about 1 mm to about 25 mm, and in another embodiment in the range of about 4 mm to about 10 mm. The amount of inclusions can be adjusted, as desired. Further, the inclusions themselves can be coated, if desired. In an embodiment, the inclusions are sucrose free inclusions. An embodiment of an inclusion is sucrose free chocolate inclusions.

Cookie doughs of the invention may have any desired overall flavor characteristic, such as (but not limited to) sugar cookies, peanut butter cookies, chocolate chip cookies, chocolate cookies, oatmeal cookies, gingerbread cookies, shortbread cookies, nut cookies (such as almond or Macadamia Nut cookies), and combinations thereof.

Cookie doughs of the invention may be made by any appropriate dough mixing and handling process that does not deleteriously diminish the solubility characteristics of the Saccharide System components prior to mixing with all of the ingredients of the cookie dough. The non-liquid components (particularly the crystalline sugar alcohol components and the long chain sugar complexes) of the Saccharide System are in one embodiment mixed with fat, and in another embodiment creamed with the fat. In the case of crystalline sugar alcohols, premixing or creaming with fat tends to preserve the crystalline nature of the crystalline sugar alcohols, particularly in the early stages of the dough manufacturing process, thereby imparting the maximum effect of the Collective Solubility in the cookie dough mixing process. In an embodiment of the dough manufacturing process, a fat/non-liquid Saccharide System component composition is prepared as described above. The liquid components of the Saccharide System are separately mixed with water to create a slurry. The slurry is then mixed with the fat/non-liquid Saccharide System component composition. This combination is then blended with dry ingredients to provide the cookie dough. Alternatively, the fat/non-liquid Saccharide System component composition, slurry and dry ingredients may be mixed together at the same time. Additional ingredients, such as flavorants and the like may be added to appropriate portions as desired.

The cookie dough may optionally be provided in a preformed shape or design, and optionally imparted with an imprinted design, such as described in the copending, commonly assigned patent application entitled "METHOD FOR MAKING SWEET COOKIE DOUGH HAVING AN IMPRINTED SURFACE", U.S. Ser. No. 10/356,341, filed on Jan. 1, 2003 now U.S. Pat. No. 7,067,167.

Cookie dough pieces may be prepared in one embodiment by forming an extruded cookie dough cylinder; cutting the cookie dough cylinder to provide individual cookie dough pieces; transferring the individual cookie dough pieces onto a movable conveyor; and optionally controllably applying an ornamental imprint on a surface of each individual cookie dough piece in a desired manner while the individual dough pieces are transported by the movable conveyor.

In another embodiment, cookie dough pieces may be prepared by a wire cutting operation. According to this process, appropriately formulated dough is fed from a hopper downwardly through one or more nozzles located above a conveyor. As the dough leaves a nozzle in the form of a dough cylinder, a cutting wire is passed through the dough so that discrete pieces of dough are separated from the dough cylinder to fall or be placed onto the conveyor. Wirecut methods provide a high-speed method for making cookies, typically producing about 1800 cookies or more per minute depending on extrusion and conveyor speeds as well as on the number of forming orifices provided by one or more forming heads. The dough pieces on the conveyor can then be collected from the conveyor for immediate use or for packaging and storage. An example of this process is described in copending provisional U.S. Patent Application Ser. No. 60/568,613.

In yet another embodiment, cookie dough pieces may be formed in desired shapes, such as "pucks" by compressing the dough into cavities in a die. In an embodiment, the dough piece formation process is carried out in a continuous process system, whereby cavities in a rotary head are filled by dough to conform the dough to a desired shape. After the desired shape is obtained, the individual dough pieces are released, ejected or discharged from the cavities by any suitable device, such as by a plunger, piston, air blast or the like. After the dough pieces are discharged from the cavities, the cavity is in one embodiment returned, optionally by rotation of a rotary head, to a position for initiation of a new filling cycle. The discharged dough pieces are conveyed to a packaging station or baking station in a conventional manner.

Embodiments of cookie dough products according to the invention are provided in refrigerated or frozen form, and packaged for shipping to the consumer. In some embodiments, the cookie dough products are provided as "freezer-to-oven" cookie dough products, where the consumer does not have to thaw the cookie dough products before placing the dough products into the oven. In these embodiments, the consumer simply removes the cookie dough pieces from the freezer and places the dough pieces directly into the oven. These embodiments may provide advantageous time savings to the consumer, who does not have to thaw the individual dough pieces before baking.

Dough embodiments of the invention provided in refrigerated or frozen form are particularly advantageous, because the dough as described herein may provide superior handling properties both for the manipulation steps required of the manufacturer for placing the dough in the various formats as described below, and at the same time for manipulation of the dough by the intermediate consumer who will bake the dough. Additionally, the dough of the present invention may provide excellent water activity, storage stability, and density properties of the dough in refrigerated or frozen form throughout the distribution chain.

The dough may be provided in a number of formats for storage in refrigerated or frozen form. In one format, the cookie dough may be provided in a brick, log or block form, for cutting into smaller portions by the consumer, who will subsequently bake the pieces. For example, cookie dough may be provided in the form of larger, sausage-like portions or "chubs" that are cut into individual cookie size pieces by the consumer, who will subsequently bake the pieces.

Although a variety of dimensions are suitable, a typical chub is a generally cylindrical shaped dough portion having a length of from about 10 to about 40 cm or longer, and a diameter of about 3 to about 10 cm or larger, depending on the desired size of the end product cookie. These formats may be provided as a frozen product, but in certain embodiments are provided as refrigerated dough products to avoid the need to thaw the dough prior to cutting into portions. This format advantageously requires simple packaging, and takes up a relatively small portion of the refrigerator space.

In another format, the cookie dough is provided in break-apart blocks, wherein predetermined dough portions of appropriate cookie size are partially separated by perforations, or are linked together by connective dough materials. In this format, the predetermined dough portions may be easily broken apart by the consumer, in certain embodiments without the use of tools, but optionally with slight assistance of a kitchen tool such as a knife or spoon. This format may be provided either in frozen or refrigerated form. In this format, the consumer can physically separate the individual portions of the block prior to baking.

Another format for home consumer frozen or refrigerated cookie dough products provides preformed separate portions, such as individual cookie "pucks." In this format, the consumer simply transfers the preformed separate portions from the packaging to a baking pan for baking at the appropriate temperature.

The invention will further be described by reference to the following nonlimiting examples.

EXAMPLES

Preparations

Example 1

Sugar Free Chocolate Chip Cookie Dough—Maltitol:Polydextrose (60:40)

Formula—Collective Solubility 1.44 (vs. 1.71 for Sucrose Containing Dough)

| Ingredient | Formula % |
| --- | --- |
| Maltitol | 16.4400 |
| Polydextrose | 11.2500 |
| Shortening | 10.8085 |
| Slurry | 9.0510 |
| Flour | 29.7415 |
| Eggs, dried | 1.5650 |
| Salt | 0.4800 |
| Sodium Bicarbonate | 0.4440 |
| Sodium Aluminum Phosphate | 0.2200 |
| Sugar Free Chocolate Chips | 20.0000 |

Process
1. Cream shortening with maltitol and polydextrose to target density.
2. Add slurry and mix.
3. Blend in flour pre-sifted with other dry ingredients.
4. Blend in sugar free chocolate chips.

Example 2

Sugar Free Chocolate Chip Cookie Dough—Maltitol: Solubilized Maltitol (60:40)

Formula—Collective Solubility 1.66 (vs. 1.71 for Sucrose Containing Dough)

| Ingredient | Formula % |
| --- | --- |
| Maltitol | 16.6100 |
| Maltitol Syrup | 13.8450 |
| Shortening | 10.8085 |
| Slurry | 6.2860 |
| Flour | 29.7415 |
| Eggs, dried | 1.5650 |
| Salt | 0.4800 |
| Sodium Bicarbonate | 0.4440 |
| Sodium Aluminum Phosphate | 0.2200 |
| Sugar Free Chocolate Chips | 20.0000 |

Process
1. Cream shortening with maltitol to target density.
2. Add slurry and mix.
3. Blend in flour pre-sifted with other dry ingredients.
4. Blend in sugar free chocolate chips.

Example 3

Sugar Free Oatmeal Cookie Dough—Lactitol:Sorbitol:Polydextrose (50:10:40)

Formula—Collective Solubility 1.34 (vs. 1.44 for Sucrose Containing Dough)

| Ingredient | Formula % |
| --- | --- |
| Lactitol | 16.9950 |
| Sorbitol | 3.3990 |
| Polydextrose | 13.5960 |
| Shortening | 12.0000 |
| Slurry | 12.7590 |
| Flour | 24.5250 |
| Oatmeal, Quick Rolled | 13.6490 |
| Eggs, dried | 1.5070 |
| Salt | 0.3760 |
| Sodium Bicarbonate | 0.6100 |
| Sodium Aluminum Phosphate | 0.2590 |
| Cinnamon | 0.3250 |

Process
1. Cream shortening with lactitol, sorbitol and polydextrose to target density.
2. Add slurry and mix.
3. Blend in oats and flour pre-sifted with other dry ingredients.

Example 4

Sugar Free Peanut Butter Cookie Dough—Maltitol:Sorbitol:Polydextrose (50:20:30)

Formula—Collective Solubility 1.14 (vs. 1.38 for Sucrose Containing Dough)

| Ingredient | Formula % |
|---|---|
| Maltitol | 16.0075 |
| Sorbitol | 6.403 |
| Polydextrose | 9.6045 |
| Shortening | 8.8224 |
| Sugar Free Peanut Butter | 13.1220 |
| Slurry | 12.6260 |
| Flour | 30.6376 |
| Eggs, dried | 1.3430 |
| Salt | 0.7000 |
| Sodium Bicarbonate | 0.5740 |
| Sodium Aluminum Phosphate | 0.1600 |

Process

1. Cream shortening and peanut butter with maltitol, sorbitol and polydextrose to target density.
2. Add slurry and mix.
3. Blend in flour pre-sifted with other dry ingredients.

Evaluations

A trained sensory panel evaluated key dough handling attributes of three different cookies: a target control, sucrose-containing chocolate chip dough commercially available as Pillsbury Ready to Bake!™ chocolate chip cookie dough "Comparative Example A," the sugar free Chocolate Chip dough from Example 1, and a commercially available sugar free chocolate chip dough sold as the Mrs. C's SUGAR FREE chewy chocolate chip cookie dough, designated herein as "Comparative Example B." The attributes measured included oiliness, stickiness, and wetness and were evaluated using seven-point intensity scales. The seven point scale corresponds to industry standard comparatives, which are described at "Sensory Evaluation Techniques" $3^{rd}$ ed. Meilgaard, Civille, Carr. The dough attributes are reported in Table 1 below.

The sugar free cookie formula from Example 1 was surprisingly close to the Comparative Example A product for all three attributes measured, even though the cookie of Comparative Example A contained sucrose and the cookie of Example 1 did not contain sucrose. These cookies provide a satisfactory cookie in optimum dough manageability and final baked quality. In contrast, the cookie dough of Comparative Example B was more oily, sticky and wet than the cookie dough of Example 1. These dough attributes are affected by the materials selected for use as the sucrose replacement in the cookie dough.

The cookie dough of Example 1 uses a Saccharide System that is a 60:40 maltitol:polydextrose blend, which results in a Collective Solubility factor of 1.44 vs. 1.71 for the sucrose-containing control. This improved solubilization allows for a significant reduction in fat while maintaining target dough manageability and baked product quality.

TABLE 1

| | | Dough properties | | |
|---|---|---|---|---|
| Cookie | Aw | Oiliness (no oiliness/ excessive oiliness) | Stickiness (not sticky/ extremely sticky) | Wetness (very dry/ very wet) |
| Comparative Example A | 0.80 | 2.0 | 3.0 | 4.0 |
| Example 1 | 0.79 | 0.8 | 2.2 | 3.0 |
| Comparative Example B | 0.77 | 5.4 | 5.4 | 6.2 |

Baked Product Evaluation for Example 1 Sugar Free Chocolate Chip Dough

Taste panels of trained evaluators evaluated key attributes for appearance, flavor and texture of sample cookies of Comparative Example A, Example 1 and Comparative Example B. Attributes were measured on seven-point intensity scales.

TABLE 2

| | Appearance | | |
|---|---|---|---|
| Cookie | Color (light/dark) | Surface Texture (smooth/rough) | Surface Oiliness (very dry/ very oily) |
| Comparative Example A | 5.0 | 5.0 | 2.0 |
| Example 1 | 4.0 | 4.5 | 1.9 |
| Comparative Example B | 5.9 | 2.9 | 4.4 |

For Appearance attributes, the target scores on a seven-point scale are considered to be +/−1 of the scale value of Comparative Example A. The cookie of Example 1 matched the cookie of Comparative Example A for appearance characteristics. As compared to the Comparative Example B, the cookie of Example 1 was closer to target for surface cracking and surface oiliness, or sheen. The cookie of Comparative Example B was evaluated to be very smooth, with a significant amount of surface oil (surface sheen).

TABLE 3

| | Flavor | | |
|---|---|---|---|
| Cookie | Sweetness (weak/strong) | Sweet Aromatics (weak/strong) | Chocolate (weak/strong) |
| Comparative Example A | 5.0 | 4.0 | 5.5 |
| Example 1 | 4.8 | 4.2 | 4.9 |
| Comparative Example B | 2.4 | 1.8 | 2.9 |

For Flavor attributes, the target scores on a seven-point scale are considered to be +/−1 of the scale value of Comparative Example A. The cookie of Example 1 also scored well vs. the cookie of Comparative Example A for sweetness, sweet aromatics, and chocolate flavor strength. The cookie of Comparative Example B was low in sweet and sweet aromatics, as well as overall chocolate flavor.

TABLE 4

| Cookie | Chewiness (not chewy/very chewy) | Hardness (very soft/very hard) | Dryness (very dry/very moist) | Dual Texture (none/ extreme) |
|---|---|---|---|---|
| Comparative Example A | 3.0 | 3.5 | 4.0 | 4.0 |
| Example 1 | 4.0 | 4.3 | 3.6 | 4.5 |
| Comparative Example B | 1.9 | 1.7 | 5.8 | 1.6 |

The cookie of Example 1 scored well vs. the cookie of Comparative Example A for texture attributes, most significantly 'dual texture.' For textural attributes, the target scores on a seven-point scale are considered to be +/−1 of the scale value of Comparative Example A. A value of 4 is the midpoint of the scale, e.g. not too soft, not too hard. The cookie of Comparative Example B was found to be very soft, too moist, and with little dual texture. The cookie of Example 1 has a targeted blend of crystalline maltitol and polydextrose for sucrose replacement, i.e. the blend has similar solubility to that of sucrose in the control dough. Targeting the collective solubility at 1.71+/−20% for this system produces baked product with key texture attributes.

All patents, patent documents, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

The invention claimed is:

1. A reduced sucrose cookie dough comprising a Saccharide System, wherein the Saccharide System comprises:
   a) a crystalline sugar alcohol comprising at least one member selected from the group consisting of crystalline maltitol, crystalline lactitol, and crystalline isomalt; and
   b) at least one member selected from the group consisting of a liquid sugar alcohol and a long chain sugar complex;
   wherein the Saccharide System has a Collective Solubility that is within about 20% of the solubility of sucrose in the dough; and
   wherein the cookie dough has a sucrose content of less than about 2% by weight based on the weight of the cookie dough.

2. The cookie dough of claim 1, wherein the cookie dough has a sucrose content of less than 0.5 grams per serving size.

3. The cookie dough of claim 1, wherein the cookie dough has a sugar content of less than about 2% by weight based on the weight of the cookie dough.

4. The cookie dough of claim 1, wherein the cookie dough has a sugar content of less than 0.5 grams per serving size.

5. The cookie dough of claim 1, wherein the Saccharide System has a Collective Solubility that is within about 10% of the solubility of sucrose in the dough.

6. The cookie dough of claim 1, wherein the long chain sugar complex is selected from the group consisting of polydextrose, oligofructose complexes and mixtures thereof.

7. A reduced sucrose cookie dough of claim 1, comprising a Saccharide System, wherein the Saccharide System comprises:
   a) from about 50 to about 70% of a crystalline sugar alcohol comprising at least one member selected from the group consisting of crystalline maltitol, crystalline lactitol, and crystalline isomalt based on the weight of the total Saccharide System; and
   b) from about 30 to about 50% of at least one member selected from the group consisting of a liquid sugar alcohol and a long chain sugar complex based on the weight of the total Saccharide System.

8. The cookie dough of claim 7, wherein the Saccharide System comprises from about 50 to about 70% of a crystalline sugar alcohol and from about 30 to about 50% of a liquid sugar alcohol based on the weight of the total Saccharide System.

9. The cookie dough of claim 7, wherein the Saccharide System comprises from about 50 to about 70% crystalline maltitol and from about 30 to about 50% polydextrose based on the weight of the total Saccharide System.

10. The cookie dough of claim 7, wherein the Saccharide System comprises from about 50 to about 70% of a crystalline sugar alcohol, from about 10 to about 20% of a liquid sugar alcohol and from about 20 to about 40% of a long chain sugar complex based on the weight of the total Saccharide System.

11. The cookie dough of claim 7, wherein the Saccharide System comprises from about 50 to about 70% of a non-sorbitol crystalline sugar alcohol, from about 10 to about 20% of crystalline sorbitol and from about 20 to about 40% of a long chain sugar complex based on the weight of the total Saccharide System.

12. The cookie dough of claim 1, wherein the Saccharide System comprises a high potency sweet flavorant.

13. The cookie dough of claim 1, wherein the dough contains less than about 12% of added fat by weight.

14. The cookie dough of claim 1, wherein the dough has a calorie content of less than about 100 calories per 26 grams.

15. The cookie dough of claim 1, wherein the cookie dough is refrigerated.

16. The cookie dough of claim 1, wherein the cookie dough is frozen.

17. A method of making reduced sucrose cookie dough comprising:
   a) mixing a fat with a crystalline sugar alcohol selected from at least one member of the group consisting of crystalline maltitol, crystalline lactitol, and crystalline isomalt to form a fat/crystalline sugar alcohol composition;
   b) mixing the fat/crystalline sugar alcohol composition of step a) with flour, water and additional Saccharide System ingredients, wherein the additional Saccharide System ingredients comprise at least one member of the group consisting of a liquid sugar alcohol and a long chain sugar complex to form a cookie dough;
   wherein the Saccharide System has a Collective Solubility that is within about 20% of the solubility of sucrose in the dough; and
   wherein the cookie dough has a sucrose content of less than about 2% by weight based on the weight of the cookie dough.

18. A method of claim 17, wherein the cookie dough has a sucrose content of less than 0.5 grams per serving size.

19. The method of claim 17, wherein the cookie dough has a sugar content of less than about 2% by weight based on the weight of the cookie dough.

20. A product made by the method of making reduced sucrose cookie dough comprising:
   a) mixing a fat with a crystalline sugar alcohol selected from at least one member of the group consisting of crystalline maltitol, crystalline lactitol, and crystalline isomalt to form a fat/crystalline sugar alcohol composition;

b) mixing the fat/crystalline sugar alcohol composition of step a) with flour, water and additional Saccharide System ingredients, wherein the additional Saccharide System ingredients comprise at least one member of the group consisting of a liquid sugar alcohol and a long chain sugar complex to form a cookie dough;

wherein the Saccharide System has a Collective Solubility that is within about 20% of the solubility of sucrose in the dough; and wherein the cookie dough has a sucrose content of less than about 2% by weight based on the weight of the cookie dough.

* * * * *